(12) United States Patent
Sobue

(10) Patent No.: US 7,800,406 B2
(45) Date of Patent: Sep. 21, 2010

(54) APPARATUS, CIRCUIT AND METHOD OF TRANSMITTING SIGNAL

(75) Inventor: Toshiharu Sobue, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/314,981

(22) Filed: Dec. 19, 2008

(65) Prior Publication Data
US 2009/0219072 A1 Sep. 3, 2009

(30) Foreign Application Priority Data
Feb. 28, 2008 (JP) .............................. 2008-048011

(51) Int. Cl.
*H03K 19/173* (2006.01)
*G06F 7/38* (2006.01)

(52) U.S. Cl. ........................................ 326/46; 327/108

(58) Field of Classification Search .................. 326/82, 326/46, 86; 327/108, 109, 124
See application file for complete search history.

(56) References Cited

U.S. PATENT DOCUMENTS
6,366,126 B1 * 4/2002 Watarai ........................ 326/83
2004/0212404 A1 * 10/2004 Shizuki ....................... 327/108

FOREIGN PATENT DOCUMENTS
JP 2004-200990 7/2004

* cited by examiner

*Primary Examiner*—Daniel D Chang
(74) *Attorney, Agent, or Firm*—McGinn IP Law Group, PLLC

(57) ABSTRACT

An apparatus includes a transmission circuit which transmits a data by a differential signal, and a control circuit which halts a portion of the differential signal under a predetermined condition.

6 Claims, 5 Drawing Sheets

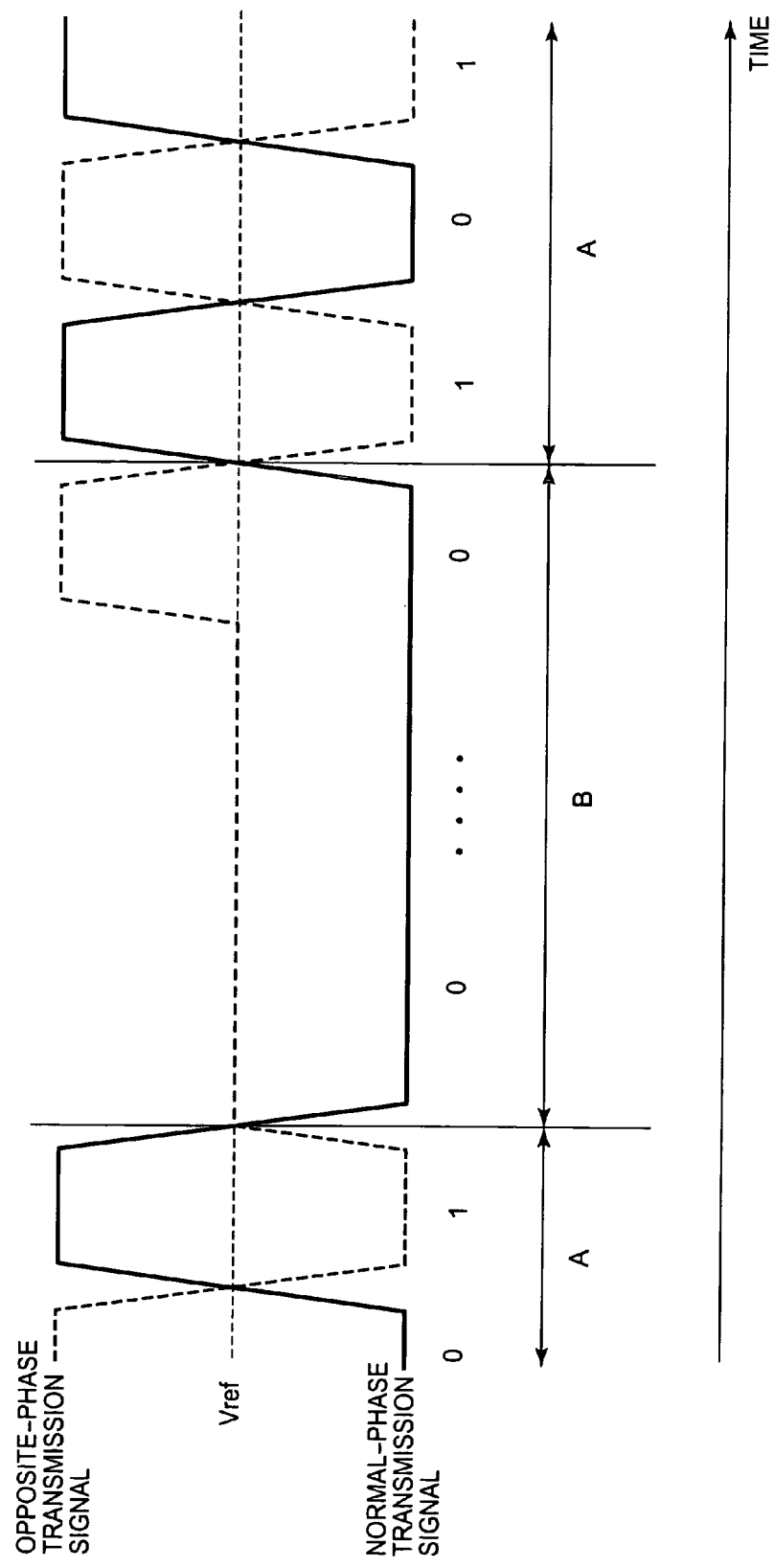

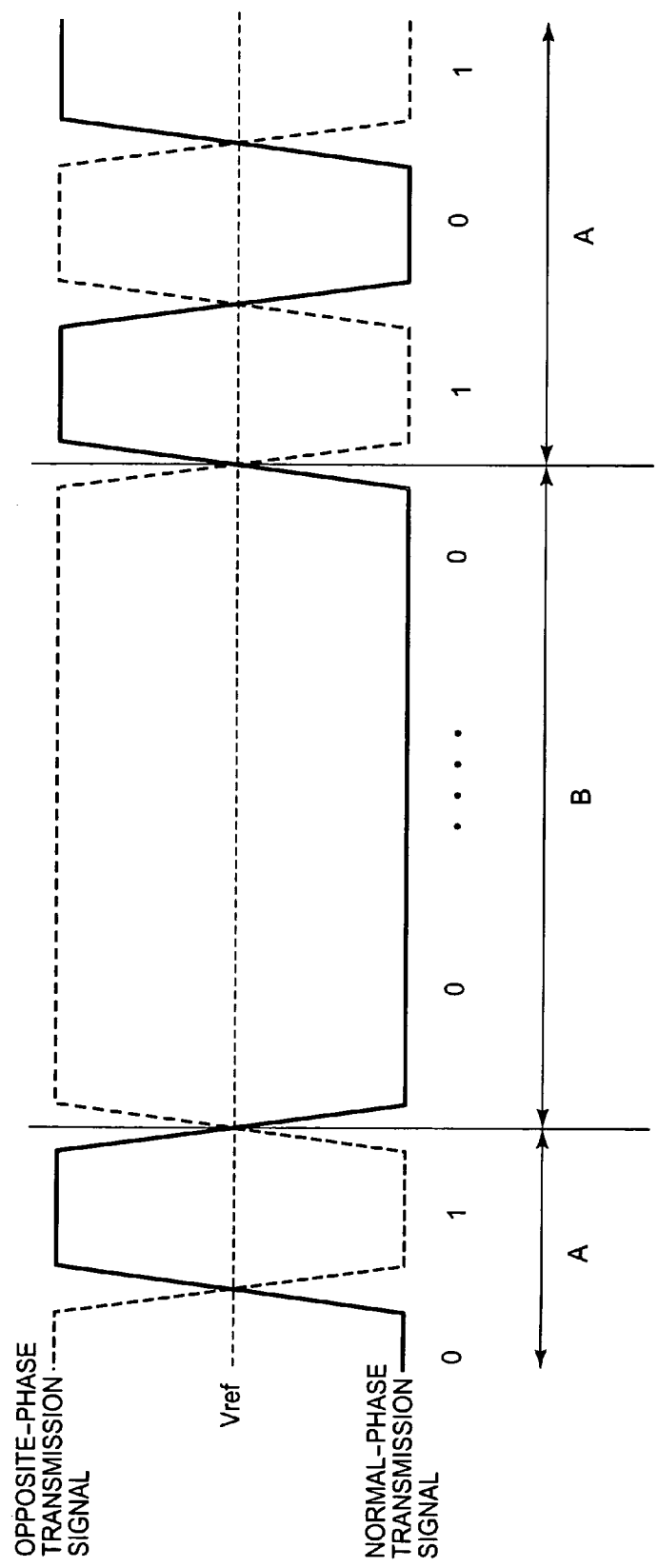

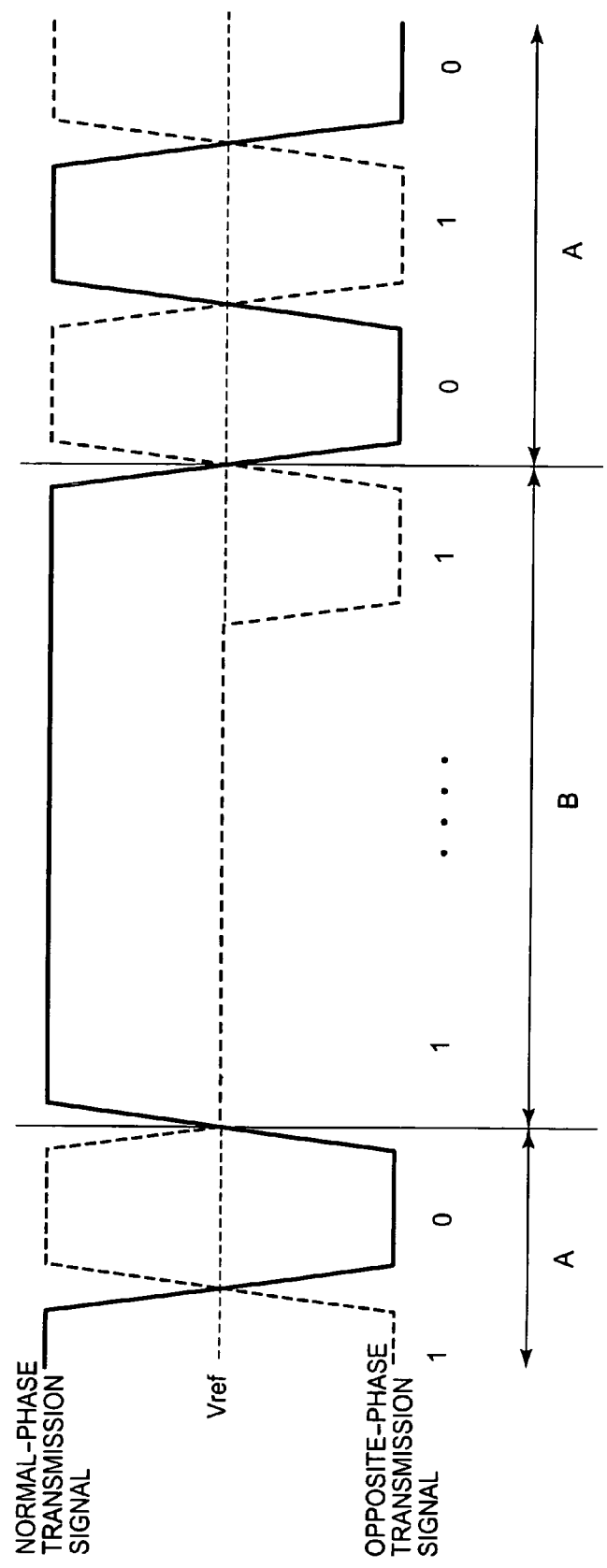

Figure 1:
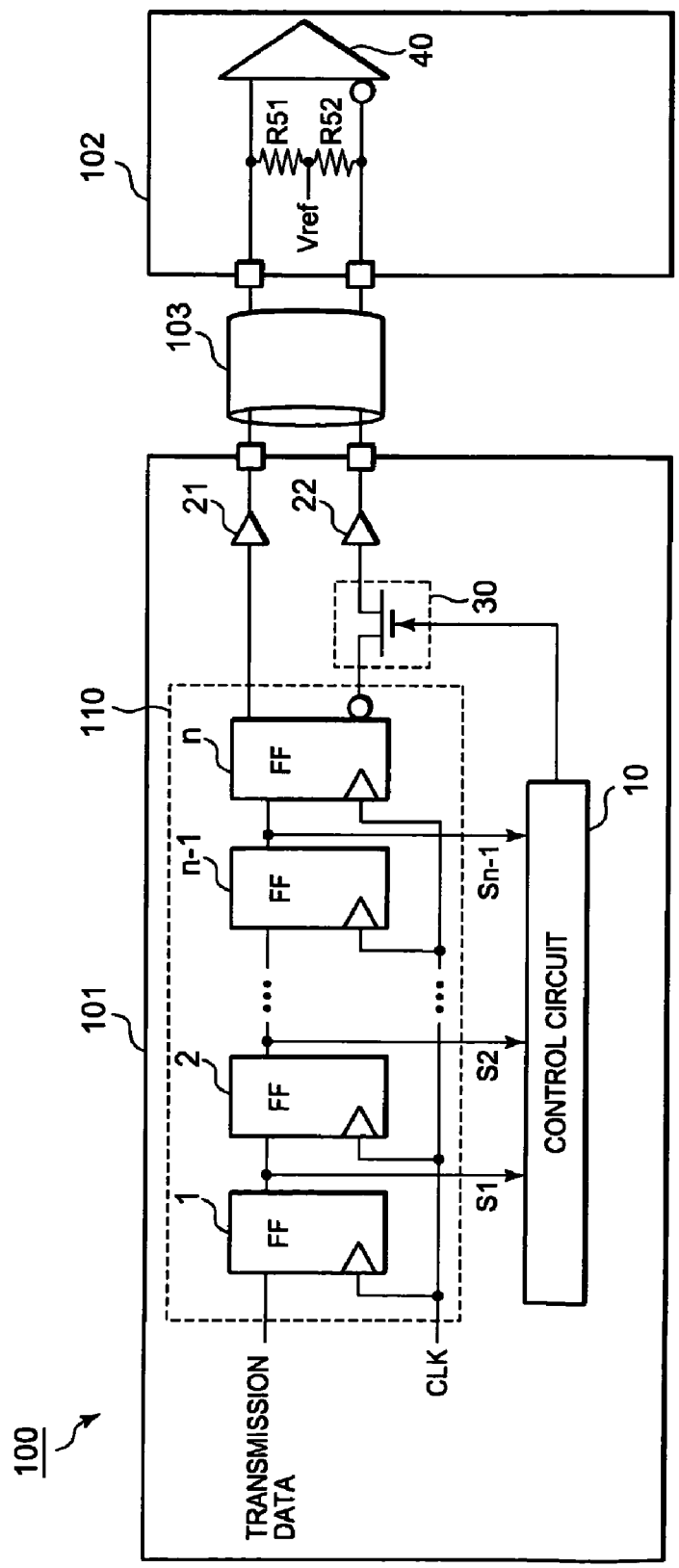

APPARATUS, CIRCUIT AND METHOD OF TRANSMITTING SIGNAL

This application is based upon and claims the benefit of priority from Japanese patent application No. 2008-048011, filed on Feb. 28, 2008, the disclosure of which is incorporated herein in its entirety by reference.

BACKGROUND OF THE INVENTION

1. Field of the Invention

The present invention relates to a transmission circuit, and in particular, to a transmission circuit which outputs a differential signal.

2. Description of Related Art

A CML (current mode logic) circuit is generally used as an output buffer of a transmission circuit for a high-speed interface circuits. The CML circuit uses a small-amplitude signal level and a differential signal transmitting method for signal transmission, in order to prevent an attenuation of the signal. Further, the CML circuit is a circuit through which current always passes, resulting in a large amount of current being consumed. Furthermore, in view of the trend for increasing speed of signal transmission, the current consumption of the CML circuit increases more and more, and becomes a problem.

In Patent Document 1, a technique for decreasing electric power consumption of an interface circuit of a transceiver system is disclosed.

[Patent Document 1] Japanese Unexamined Patent Application Publication No. 2004-200990

SUMMARY OF THE INVENTION

According to one exemplary aspect of the present invention, an apparatus includes a transmission circuit which transmits a data by a differential signal, and a control circuit which halts a portion of the differential signal under a predetermined condition.

According to another exemplary aspect of the present invention, a circuit includes a transmission circuit which transmits a data by a differential signal, and a control circuit which halts a portion of the differential signal under a predetermined condition.

According to another exemplary aspect of the present invention, a method includes transmitting a data by a differential signal, and halting a portion of the differential signal under a predetermined condition.

BRIEF DESCRIPTION OF THE DRAWINGS

Other exemplary aspects and advantages of the invention will be made more apparent by the following detailed description and the accompanying drawings, wherein:

FIG. 1 is an example of a block diagram of the present invention;

FIG. 2A is an example of a waveform of the present invention;

FIG. 2B is another example of a waveform of the present invention;

FIG. 3 is yet another example of a waveform of the present invention;

FIG. 4 is another example of a waveform of the present invention; and

FIG. 5 is yet another example of a waveform of the present invention.

DETAILED DESCRIPTION OF THE EXEMPLARY EMBODIMENT

A power consumption increase according to an increase in speed of an interface is problematic. In a high-speed interface circuit such as a CML circuit, a differential circuit is used for preventing an attenuation of a transmission signal through a transmission path. A transmission circuit using the differential circuit transmits a normal-phase signal and an opposite-phase signal. Therefore, the number of output buffers is twice that of a single-phase transmission circuit, and thus, the power consumption is increased.

A transmission circuit which is disclosed in the Patent Document 1 is configured as a single-phase transmission circuit. Therefore, when such a transmission circuit is configured as a differential transmission circuit, the increase in power consumption may not be reduced.

In the present invention, by halting a mate signal of the differential signal (e.g., the differential signal includes a normal phase signal and an opposite phase signal which is a "mate" to the normal phase signal and vice versa), the power consumption may be reduced.

FIG. 1 shows an example of a block diagram of an interface circuit 100. Interface circuit 100 includes a transmission circuit 101, a receiver circuit 102, and a transmission path 103 connected to the transmission circuit 101 and the receiver circuit 102. The transmission circuit 101 and the receiver circuit 102 may be installed in different apparatuses with each other.

The transmission circuit 101 includes a plurality of flip-flops 1 to n, a control circuit 10, buffers 21 and 22, and a switching circuit 30.

The plurality of flip-flops 1 to n operate as a monitor circuit. The plurality of flip-flops 1 to n (a monitor circuit) are connected in series to form a shift register 110. Each of the flip-flops 1 to n receives a clock signal CLK and transfers input data to the next flip-flop in sync with the clock signal.

Specifically, the flip-flops are connected as follows. Transmission data is inputted to an input terminal of the flip-flop 1, an output terminal of the flip-flop 1 is connected to an input terminal of the flip-flop 2, an output terminal of the flip-flop 2 is connected to an input terminal of the flip-flop 3, . . . , and an output terminal of the flip-flop n−1 is connected to an input terminal of the flip-flop n. The flip-flops 1 to n−1 output respective output data signals S1 to Sn−1 to the succeeding flip-flops. The flip-flop n outputs normal-phase and opposite-phase differential signals to the buffers 21 and 22, respectively, in response to an output data signal of the flip-flop n−1.

In other words, the flip-flop n outputs the opposite-phase output data signal from one output terminal thereof (hereinafter, referred to as an "opposite-phase output terminal") to the switching circuit 30, and outputs the normal-phase output data signal from the other output terminal (hereinafter, referred to as a "normal-phase output terminal") to the buffer 22.

The switching circuit 30 is connected between the opposite-phase output terminal of the flip-flop n and an input terminal of the buffer 22. The switching circuit 30 is configured by a MOS transistor, for example. The switching circuit 30 is turned OFF according to a control signal input to a gate of the MOS transistor so as to block the opposite-phase output signal from the flip-flop n to the buffer 22. Further, the configuration of the switching circuit 30 may be modified as long as the switching circuit 30 may switch between ON and OFF according to the control signal. For example, the switching circuit 30 may be configured by a relay switch.

The buffer 21 buffers the normal-phase output of the flip-flop n and outputs the normal-phase output to the transmission path 103 as a normal-phase transmission signal. The buffer 22 buffers the opposite-phase output of the flip-flop n which is passed through the switching circuit 30, and outputs the opposite-phase output to the transmission path 103 as an opposite-phase transmission signal.

The control circuit 10 receives the respective output data signals S1 to Sn–1 of the flip-flops 1 to n–1, and detects the successiveness of transmission data values. Then, the control circuit 10 transmits the control signal to the switching circuit 30 according to the detection result. For example, if the control circuit 10 detects transmission data values which is the same as one another and successive, as like "00 . . . 0" or "11 . . . 1" for example, the control circuit 10 transmits the control signal for turning OFF the switching circuit 30 to the switching circuit 30.

In other words, a mate signal of the differential signal is halted according to the control signal. The minimum number of successive transmission data values which is the same with one another and successive when the control circuit 10 makes the switching circuit 30 turned off may be arbitrarily set. For example, when the control circuit 10 detects that three transmission data values are the same with one another and are successive, such as "000" or "111", the control circuit 10 transmits the control signal for turning OFF the switching circuit 30 to the switching circuit 30. In this example, when two transmission data values being the same with each other are successive such as "00", the switching circuit 30 is maintained at the ON state.

The receiver circuit 102 includes an input differential amplifier 40 and resistor elements R51 and R52. One differential input terminal of the differential amplifier 40 receives the output signal of the buffer 21 through the transmission path 103, and the other differential input terminal receives the output signal of the buffer 22 through the transmission path 103. The resistor element R51 is connected between the one input terminal of the differential amplifier 40 and a supply node of a voltage Vref. The resistor element R52 is connected between the other input terminal of the differential amplifier 40 and the supply node of the voltage Vref. The resistor elements R51 and R52 each have substantially the same resistance value as the characteristic impedance of the transmission path 103. Thus, impedance matching of the receiver circuit 102 with the transmission path 103 is accomplished.

An example of an operation of the exemplary embodiment will be described below.

A transmission data is sequentially transmitted to the flip-flop n through the flip-flops 1 to n–1. The flip-flop n outputs the differential signal. During a normal operation, a normal-phase output transmission signal from the output buffer 21 and an opposite-phase output transmission signal from the output buffer 22 are outputted to the receiver circuit 102 through the transmission path 103.

Figure 2A:
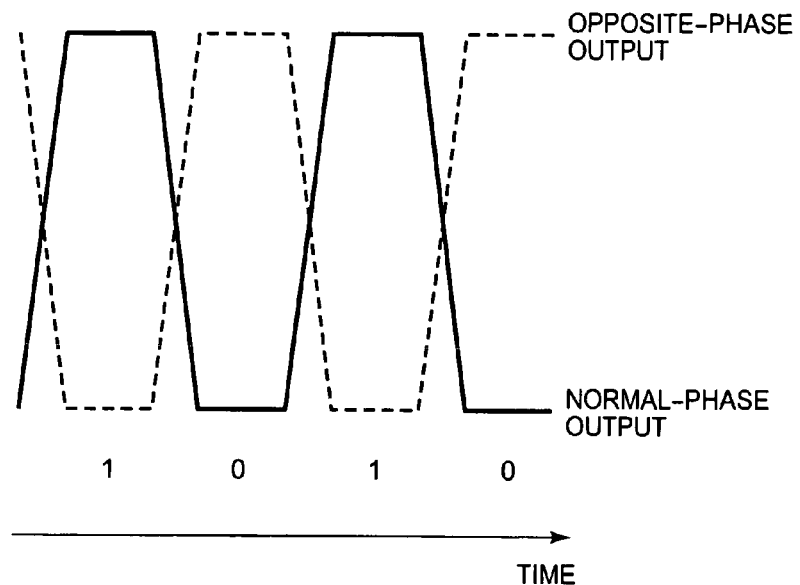

The control circuit 10 detects the state of the transmission data values from the output signals S1 to Sn–1 of the flip-flops 1 to n–1. For example, if the transmission data is "0101", the output signals outputted from the flip-flop n becomes a waveform as shown in FIG. 2A.

Figure 2B:
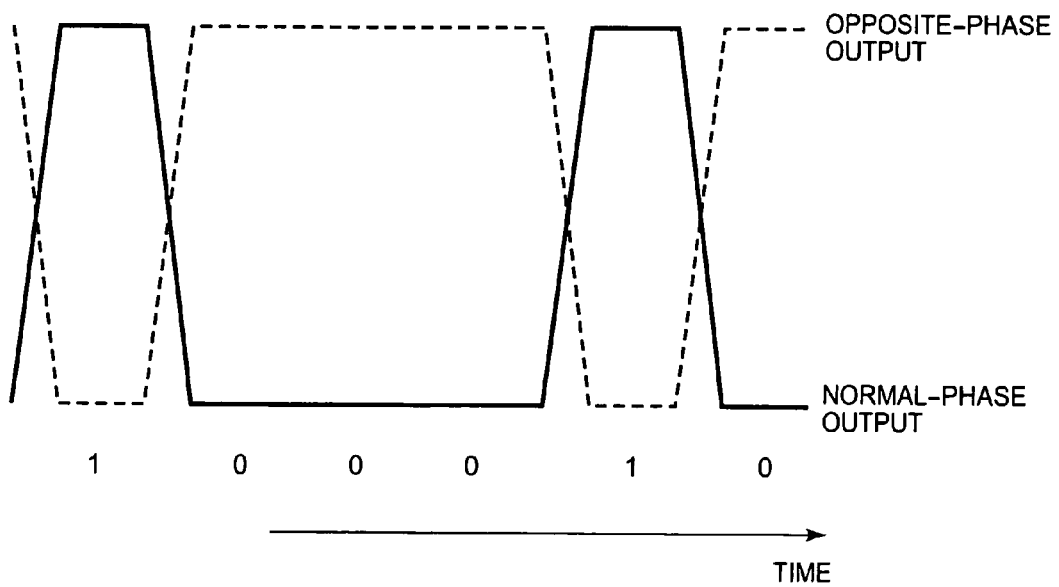

Further, if the transmission data is "010001", the output waveforms become as shown in FIG. 2B, since the transmission data "010001" has a successiveness of "000".

When the transmission data such as "0101", in which data values "0" and "1" are repeated, is inputted, the waveforms of the output signals from the flip-flop n frequently rise and fall. Therefore, the control circuit 10 determines that a period of the waveform is short (i.e., the frequency is high), on the basis of the transmission data detected from the respective output signals of the flip-flops 1 to n–1. Further, according to the waveform of the output signals of the flip-flop n, the transmission signal outputted from the transmission circuit 101 also has a waveform in which rising and falling frequently occur.

On the other hand, if the transmission data such as "10001", in which "0" is successively repeated and the number of repetition of data "0" and "1" is small, is inputted, the waveform of the output signals of the flip-flop n rarely repeatedly rise and fall. Therefore, the control circuit 10 determines that the period of the waveform is long (the frequency is low), on the basis of the transmission data detected from the respective output signals of the flip-flops 1 to n–1. Further, the long waveform period may mean that either "0" or "1" is successively repeated twice or more in the transmission data, for example.

According to the values of the transmission data detected from the respective output signals S1 to Sn–1 of the flip-flops 1 to n–1 as described above, the control circuit 10 turns on the switching circuit 30 by a control signal when determining that the waveform period of the output signals outputted from the flip-flop n is short, and turns off the switching circuit 30 by the control signal when determining that the waveform period of the output signals outputted from the flip-flop n is long.

In other words, when the period of the transmission signal is shorter than a predetermined period, the normal differential signal is outputted from the buffer 21 and 22. Conversely, when the period of the transmission signal is longer than the predetermined period, the mate signal of the differential signal is halted. When the period of the transmission signal is longer than the predetermined period, the mate signal of the differential signal is transmitted only from the buffer 21.

FIG. 3 shows an example of the waveform of output transmission signals outputted from the transmission circuit 101 according to the exemplary embodiment. A term A is a transmission term of the normal differential signal in which the switching circuit 30 is turned ON, and a term B is a transmission term of a single phase signal (i.e., the mate signal of the differential signal) in which the switching circuit 30 is turned OFF. Further, FIG. 4 shows the waveform of output transmission signals of a transmission circuit including a differential circuit according to the related art, for comparison. Furthermore, the transmission signals shown in FIGS. 3 and 4 are waveforms which are outputted when the values of the transmission data are "1010 . . . 010", for example.

In both of the terms A of FIGS. 3 and 4, the signal transmission of normal differential signals is performed. In the term B of FIG. 3, since the switching circuit 30 blocks input of the opposite-phase signal to the buffer 22, the signal amplitude of the opposite-phase signal does not occur. In other words, the buffer 22 does not operate and thus does not consume the power consumption. However, in the transmission circuit including the differential circuit according to the related art of FIG. 4, the normal differential transmission signal is always outputted. In other words, the buffer circuit always operates even in (during) the term B.

The term B of FIG. 3 shows the signal transmission of a single phase signal when the normal-phase transmission signal is at a low level (transmission data is "0"), and a similar operation may be performed even when the normal-phase transmission signal is at a high level (transmission data is "1"), as shown in FIG. 5.

As described above, the transmission circuit according to the exemplary embodiment functions as a differential circuit when the transmission signals are high-speed signals in which variation such as rising and falling frequently occurs in the waveforms thereof (the period thereof is short), so as to make high-speed data transmission possible, and blocks the opposite-phase signal when the transmission signals are low-speed signals in which variation rarely occurs in the waveforms thereof (the period thereof is long). In this way, the transmission circuit according to the exemplary embodiment stops the operation of the buffer which buffers the mate signal of the differential signal in the case of a low-speed signal in which variation such as rising and falling rarely occur in the waveform thereof (the period thereof is long), which makes it possible to reduce the power consumption of the transmission circuit.

Further, the present invention is not limited to the above-mentioned embodiment but may be arbitrarily modified. For example, in the above-mentioned embodiment, the switching circuit is disposed on the side of the opposite-phase output signal. However, the switching circuit may be disposed on the side of the normal-phase output signal. Further, the buffer 22 may include the switching circuit 30 inside thereof so that, even when signals from the flip-flop n are input in the term B of FIG. 3, a signal from the flip-flop n is blocked by the switching circuit 30 within the buffer 22.

Furthermore, in the above-mentioned embodiment, the shift register 110 functions as a monitor circuit which informs the control circuit 10 of signal variation of the transmission data by the output signals from the individual flip-flops. The shift register 110 may have a structure different from that in the above-mentioned embodiment so long as it has functions to monitor the successiveness of the values of the transmission data and to output, to the control circuit 10, information on whether the same values are successive.

For example, the shift register may have a counter for counting a clock signal and a comparator for determining whether the transmission data have either "0" (the signal level thereof is low) or "1" (the signal level thereof is high), and may output, to the control circuit 10, information on whether "0" or "1" is successively repeated in a predetermined count period. In this case, it is not required to form plural flip-flops, unlike the shift register in the above-mentioned exemplary embodiment.

Further, it is noted that Applicant's intent is to encompass equivalents of all claim elements, even if amended later during prosecution.

What is claimed is:

1. An apparatus, comprising:
a transmission circuit which transmits a data by a differential signal; and
a control circuit which halts a portion of the differential signal under a predetermined condition,
wherein the transmission circuit comprises:
a plurality of sequential circuits having a series connection,
wherein the data passes through the sequential circuits, and
wherein the control circuit receives output signals of each of the sequential circuits, and determines whether the differential signal is under the predetermined condition, according to the output signals.

2. An apparatus comprising:
a transmission circuit which transmits a data by a differential signal; and
a control circuit which halts a portion of the differential signal under a predetermined condition,
wherein the control circuit halts the portion of the differential signal while the differential signal becomes a period longer than a predetermined period, wherein the transmission circuit comprises:
a plurality of sequential circuits having a series connection,
wherein the data passes through the sequential circuits, and
wherein the control circuit receives output signals of each of the sequential circuits, and determines that the differential signal becomes the period longer than the predetermined period when the control circuit receives the output signals having successive same values.

3. An apparatus comprising:
a transmission circuit which transmits a data by a differential signal; and
a control circuit which halts a portion of the differential signal under a predetermined condition,
wherein the transmission circuit comprises:
a plurality of sequential circuits having a series connection,
wherein the data passes through the sequential circuits, and
wherein the control circuit receives output signals of each of the sequential circuits, and halts the portion of the differential signal while the output signals comprise successive same values.

4. A method comprising:
transmitting a data by a differential signal;
halting a portion of the differential signal under a predetermined condition;
transmitting the differential signal by a transmission circuit which comprises a plurality of sequential circuits having a series connection, the data passing through the sequential circuits;
receiving output signals of each of the sequential circuits; and
determining whether the differential signal is under the predetermined condition according to the output signals.

5. A method comprising:
transmitting a data by a differential signal;
halting a portion of the differential signal under a predetermined condition;
transmitting the differential signal by a transmission circuit which comprises a plurality of sequential circuits having a series connection, the data passing through the sequential circuits;
receiving output signals of each of the sequential circuits;
determining that the differential signal becomes a period longer than a predetermined period when the control circuit receives the output signals having successive same values; and
halting the portion of the differential signal while the differential signal becomes the period longer than the predetermined period.

6. A method comprising:
transmitting a data by a differential signal;
halting a portion of the differential signal under a predetermined condition;
transmitting the differential signal by a transmission circuit which comprises a plurality of sequential circuits having a series connection, the data passing through the sequential circuits;
receiving output signals of each of the sequential circuits; and
halting the portion of the differential signal while the output signals comprise successive same values.

* * * * *